(12) United States Patent
Wheat et al.

(10) Patent No.: US 7,572,304 B2
(45) Date of Patent: Aug. 11, 2009

(54) APPARATUS AND METHOD FOR PREFERENTIAL OXIDATION OF CARBON MONOXIDE

(75) Inventors: W. Spencer Wheat, Missouri City, TX (US); Daniel G. Casey, Kingwood, TX (US); Curtis L. Krause, Houston, TX (US); Marshall D. Wier, Katy, TX (US); David W. Harrison, Sr., Houston, TX (US)

(73) Assignee: Texaco Inc., San Ramon, CA (US)

( * ) Notice: Subject to any disclaimer, the term of this patent is extended or adjusted under 35 U.S.C. 154(b) by 163 days.

(21) Appl. No.: 10/951,948

(22) Filed: Sep. 28, 2004

(65) Prior Publication Data

US 2006/0067863 A1 Mar. 30, 2006

(51) Int. Cl.
*C10L 3/00* (2006.01)
(52) U.S. Cl. .............. 48/127.9; 48/197 R; 423/652; 423/653; 423/654
(58) Field of Classification Search .............. 422/190, 422/193, 195, 198, 202, 211; 48/197 R, 48/127.9, 61; 423/652, 653, 654
See application file for complete search history.

(56) References Cited

U.S. PATENT DOCUMENTS

| | | | |
|---|---|---|---|
| 2,127,561 A | 8/1938 | Herrmann | |
| 2,280,081 A | 4/1942 | Prickett et al. | |
| 3,380,800 A | 4/1968 | Marten | |
| 5,271,916 A | 12/1993 | Vanderborgh | |
| 5,330,727 A | 7/1994 | Trocciola et al. | |
| 5,518,705 A | 5/1996 | Buswell et al. | |
| 5,658,681 A | 8/1997 | Sato et al. | |

(Continued)

OTHER PUBLICATIONS

Choi, et al., "Kinetics, Simulation and Insights for CO Selective Oxidation in Fuel Cell Applications," *Journal of Power Sources*, vol. 129, pp. 245-254 (2004).

(Continued)

*Primary Examiner*—N. Bhat
(74) *Attorney, Agent, or Firm*—Melissa Patangia; Frank C. Turner (57) ABSTRACT

An apparatus and method for the preferential oxidation of carbon monoxide in a hydrogen-rich fluid. The apparatus utilizes one or more reactors that are dimensioned to optimize the exothermic oxidation reaction and the transfer of heat to and from the catalyst bed. A reactor of the apparatus has an elongated cylindrical catalyst bed and heat transfer means adjacent the catalyst bed. The heat transfer means is suitable for pre-heating the catalyst bed during start-up operations and for removing the heat from the catalyst bed during the oxidation reaction. One or more reactors of different dimensions may be utilized depending upon the pressure of the hydrogen-rich fluid to be directed into the apparatus and the pressure requirements for the carbon monoxide-depleted fluid exiting the apparatus. For instance, in low pressure operations where it may be desirable to minimize the pressure drop across the apparatus, two or more reactors having relatively smaller dimensions can be utilized. In higher pressure operations where pressure drop across the preferential oxidation apparatus is of less concern, a single reactor having larger dimensions may be utilized. The relatively narrow dimension of the catalyst bed coupled with the relatively large surface are used for heat transfer provides for more uniform temperatures within the catalyst bed and improved temperature control of the bed.

7 Claims, 3 Drawing Sheets

U.S. PATENT DOCUMENTS

| | | | |
|---|---|---|---|
| 6,010,675 A | 1/2000 | Trocciola et al. | |
| 6,126,908 A * | 10/2000 | Clawson et al. | 422/190 |
| 6,238,815 B1 * | 5/2001 | Skala et al. | 429/17 |
| 6,284,206 B1 | 9/2001 | Lesieur et al. | |
| 6,293,979 B1 * | 9/2001 | Choudhary et al. | 48/198.7 |
| 6,475,454 B1 | 11/2002 | Cole et al. | |
| 6,620,386 B1 | 9/2003 | Welch | |
| 6,641,625 B1 * | 11/2003 | Clawson et al. | 48/127.9 |

OTHER PUBLICATIONS

Li, et al., "Selective combinatorial catalysis, challenges andopportunities: the preferential oxidation of carbon monoxide," *Catalysis Today*, vol. 81, pp. 437-447 (2003).

* cited by examiner

APPARATUS AND METHOD FOR PREFERENTIAL OXIDATION OF CARBON MONOXIDE

FIELD OF THE INVENTION

The present invention relates to a reactor and apparatus for reducing the concentration of carbon monoxide included in a carbon monoxide-containing hydrogen-rich reformate and to a method for the same.

BACKGROUND OF THE INVENTION

Hydrogen can readily be produced by well-known processes such as the partial oxidation of a hydrocarbon with air or oxygen and the steam reforming of hydrocarbons or alcohols with steam. Historically, the petrochemical industry has been the major producer of hydrogen, producing large volumes of hydrogen for use in various on-site industrial processes. Not surprisingly, such production has failed to produce an infrastructure for the widespread production and distribution of hydrogen.

More recently, advances in fuel cell technology have prompted the development of technologies for smaller-scale production of hydrogen suitable for use in mobile and stationary fuel cell systems. As is well known, fuel cells generate electricity from chemical oxidation-reduction reactions and can provide several advantages over other forms of power generation. For example, fuel cells provide cleaner vehicle emissions, quieter operation and can have higher efficiencies than other power generation systems. Such advantages have lead to increasing demand for fuel cells and hydrogen production systems appropriate for fueling them.

Typically, a fuel processor or reformer is used to convert a fuel source, such as a hydrocarbon(s) and/or alcohol(s) to a hydrogen-rich reformate. However, the reforming of such fuels generally produces a hydrogen-rich reformate that contains impurities such as carbon monoxide, carbon dioxide, and potentially sulfur and nitrogen-containing compounds as well. Carbon monoxide is frequently present in such reformate compositions at concentrations that will poison fuel cell catalysts. In the case of polymer electrolyte membrane (PEM) fuel cells, levels of carbon monoxide exceeding 100 ppm cannot be tolerated by the cell's catalyst and levels as low as 5 ppm can have a significant adverse effect on fuel cell performance. As a result, the reduction and/or removal of carbon monoxide from a hydrogen-rich reformate intended for PEM fuel cell applications is of particular concern.

It is known that the level of carbon monoxide in a reformate composition can be reduced by utilizing a water-gas shift reaction. To achieve this, water, e.g. steam, is added to a flow of reformate to lower its temperature and to increase the steam-to-carbon ratio. During the reaction, carbon monoxide and water are catalytically converted to carbon dioxide and hydrogen according to the equation $$CO + H_2O \rightarrow CO_2 + H_2.$$

Lower temperatures and higher steam-to-carbon ratios favor this shift reaction. However, while a water gas shift reaction is valuable for converting large amounts of carbon monoxide to carbon dioxide, the reaction is not well suited for removing trace amounts of carbon monoxide. Because reformate compositions subjected to shift reactions can still contain detrimental amounts of carbon monoxide, it is generally necessary to further reduce the level of carbon monoxide through other means.

The carbon monoxide content of the reformate can be further reduced through a preferential oxidation reaction. The preferential oxidation of carbon monoxide is described by Choi et al., in a paper entitled, "Kinetics, Simulation And Insights For CO Selective Oxidation In Fuel Cell Applications," *Journal of Power Sources*, vol. 129, pp. 246-254 (2004), and in U.S. Pat. No. 5,271,916 to Vanderbourgh, each of which is incorporated herein by reference. Generally, preferential oxidation reactors may be either (1) adiabatic, wherein the temperature of the catalyst is allowed to rise due to the exothermic nature of the reaction(s), or (2) isothermal, wherein the temperature of the catalyst is maintained substantially constant by removing the heat generated by the reaction(s). Adiabatic systems typically include a number of sequential stages that reduce the carbon monoxide content in a stepwise fashion so as to avoid excessively high temperatures that might otherwise be produced in a single stage reactor.

A preferential oxidation reactor contains an oxidation catalyst for oxidizing carbon monoxide according to the equation $$CO + \tfrac{1}{2}O_2 \rightarrow CO_2.$$

Because hydrogen is present in the hydrogen-rich reformate, there are two competing reactions that can also occur, namely, the oxidation of hydrogen $$H_2 + \tfrac{1}{2}O_2 \rightarrow H_2O,$$

and a reverse water-gas shift reaction $$H_2 + CO_2 \rightarrow CO + H_2O.$$

As shown by these equations, the carbon monoxide oxidation reaction and the hydrogen oxidation reaction directly compete for available oxygen. While both reactions are exothermic, the oxidation of carbon monoxide is slightly more so. As a result, lower catalyst or reaction temperatures tend to favor the oxidation of carbon monoxide over the oxidation of hydrogen. Moreover, the use of excessive amounts of oxygen should also be avoided to inhibit the oxidation of hydrogen. The reverse water-gas shift reaction is an equilibrium reaction that tends to occur when there are low levels of available oxygen. In addition, the reverse water-gas shift reaction favored at low carbon monoxide concentrations and higher temperatures. Because both the carbon monoxide and hydrogen oxidation reactions are exothermic, favorable conditions for the reverse water-gas shift reaction tend to develop as the oxidation reaction(s) progress.

In summary, lower reaction temperatures tend to favor the oxidation of carbon monoxide while higher reaction temperatures favor both the hydrogen oxidation and the reverse water gas shift reactions. Moreover, the oxidation catalyst can be deactivated and/or damaged if excessively high reaction temperatures are allowed to develop with the reactor. As a result, improved temperature control is essential to the efficient oxidation of carbon monoxide. Therefore, it is desirable to provide an improved reactor, apparatus and method for reducing the carbon monoxide concentration in a hydrogen-rich reformate.

SUMMARY OF THE INVENTION

In one aspect of the instant invention, a reactor for reducing the carbon monoxide concentration of a hydrogen-rich reformate is provided. The reactor includes a reactor inlet, a reactor outlet and a side wall extending between the reactor inlet and reactor outlet. A cylindrical catalyst bed is disposed adjacent an inner surface of the side wall. The cylindrical catalyst bed has a length, diameter and a ratio of length to diameter of at least about 4:1. The cylindrical catalyst bed comprises an oxidation catalyst capable of oxidizing carbon monoxide.

The reactor also includes heat transfer means disposed adjacent an outer surface of the side wall of the reactor for transferring heat to or from the cylindrical catalyst bed. The heat transfer means can include heat exchange tubing disposed adjacent an outer surface of the side wall opposite the cylindrical catalyst bed. The heat exchange tubing is preferably capable of containing a flow of heat transfer fluid, such as a heated fluid or cooling medium. Where heat exchange tubing is utilized, the heat transfer means can further include a heat transfer paste for transferring heat between the tubing and the outer surface of the side wall. The reactor can optionally include an outer shell spaced apart from the reactor side wall that encloses the reactor inlet, reactor outlet, side wall, and heat transfer means. When an outer shell is present, the heat transfer means can include an extended surface area element, such as a metal fin, and/or a flow of a heat transfer fluid such as a heated fluid or cooling medium, that is at least partially disposed between the side wall of the reactor and the outer shell.

In another aspect of the present invention, an apparatus for reducing the carbon monoxide concentration of a hydrogen-rich reformate is provided. The apparatus includes a plurality of reactors, an inlet manifold for providing a continuous flow of hydrogen-rich fluid to each of the plurality of reactors, and an outlet manifold. Each of the plurality of reactors is parallel to one another.

At least one of the plurality of reactors has a reactor inlet, a reactor outlet, a side wall extending between the reactor inlet and reactor outlet, and a catalyst bed disposed adjacent an inner surface of the side wall. The catalyst bed comprises an oxidation catalyst capable of oxidizing carbon monoxide and preferably comprises a cylindrical bed having a length, diameter and ratio of length to diameter of at least about 4:1. Heat transfer means is disposed adjacent an outer surface of the side wall of the reactor for transferring heat to or from the catalyst bed. The heat transfer means can include heat exchange tubing disposed adjacent an outer surface of the side wall opposite the catalyst bed. The heat exchange tubing is preferably capable of containing a flow a heat transfer fluid, such as a heated fluid or cooling medium. Where heat exchange tubing is utilized, the heat transfer means can further include a heat transfer paste for transferring heat between the tubing and the outer surface of the side wall.

The inlet manifold is disposed upstream of the plurality of reactors and is in fluid communication with a reactor inlet of each of the plurality of reactors. The outlet manifold is disposed downstream of the plurality of reactors and is in fluid communication with a reactor outlet of each of the plurality of reactors. The apparatus can optionally include an outer shell spaced apart from the plurality of reactors that encloses the plurality of reactors, the inlet manifold, and the outlet manifold. When an outer shell is present, the heat transfer means can include an extended surface area element, such as a metal fin, and/or a flow of a heat transfer fluid such as a heated fluid or cooling medium, that is at least partially disposed between the side wall of the reactor and the outer shell.

In a process aspect of the present invention, a method for removing carbon monoxide from a hydrogen-rich reformate is provided. The method includes providing heat to a plurality of reactors to raise the temperature of a catalyst within each of the plurality of reactors to a reaction temperature above about 75°. Heat can be provided to the plurality of reactors by directing a heated fluid, such as steam, to an external surface of each of the reactors. A flow of reformate comprising carbon monoxide is divided into a plurality of parallel reformate streams that are directed into the plurality of reactors. A portion of the carbon monoxide in each of the parallel reformate streams is oxidized over an oxidation catalyst within each of the plurality of reactors to produce heat and a carbon monoxide-depleted reformate. The portion of carbon monoxide can be oxidized in a cylindrical catalyst bed having a length, diameter, and ratio of length to diameter of at least about 4:1. Heat is removed from the plurality of reactors so that the reaction temperature of the catalyst is less than about 200° C. Heat can be removed from the plurality of reactors by directing a cooling medium to an external surface of each of the reactors. The carbon monoxide-depleted reformate streams from each of the plurality of reactors can then be combined.

BRIEF DESCRIPTION OF THE DRAWINGS

The invention may be understood by reference to the following description taken in conjunction with the accompanying drawings.

FIG. 1b is a cross sectional view of the reactor of FIG. 1a.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

The present invention relates to a preferential oxidation reactor, an apparatus comprising such a reactor and a method for reducing the carbon monoxide concentration of a hydrogen-rich reformate. The scope of the invention should not be construed as being limited to a particular reforming reaction, the type of fuel to be reformed, nor the end use of the carbon monoxide-depleted reformate produced. The reactor and apparatus of the present invention are well suited for use in both low and high pressure applications providing favorable carbon monoxide oxidation reaction conditions for each. In applications where the hydrogen-rich reformate is at low pressure and pressure losses are of concern, the apparatus and method of the present invention provide effective carbon monoxide oxidation without excessive pressure losses.

A reactor of the present invention includes a reactor inlet for introducing a hydrogen-rich reformate and oxidant into the reactor, a reactor outlet for directing a carbon monoxide-depleted reformate from the reactor, and a side wall that extends from the reactor inlet to the reactor outlet. The reactor inlet may have a fitting or other connection means for connecting with a source of hydrogen-rich reformate and/or a source of oxidant. In some embodiments, the reactor inlet may comprise a valve or other closure means so that the reactor inlet can be closed or the flow therethrough restricted. In other embodiments, particularly where the reactor is one of a plurality of reactors that are in fluid communication with an inlet manifold, the reactor inlet may comprise a conduit and/or opening in an upstream portion of the reactor vessel that is in fluid communication with the manifold and through which hydrogen-rich reformate can enter the reactor. The reactor outlet can have a fitting or other connection means for connecting with downstream process units, storage or a hydrogen-consuming device. In some embodiments, the reactor outlet may comprise a valve or other closure means so that the reactor outlet can be closed or the flow therethrough restricted. In other embodiments, particularly where the reactor is one of a plurality of reactors that are in fluid communication with a outlet manifold, the reactor outlet may comprise a conduit and/or opening in a downstream portion of the reactor vessel that is in fluid communication with the manifold and through which carbon monoxide-depleted reformate can exit the reactor.

The side wall connecting the reactor inlet and reactor outlet encloses the catalyst, defines the space within which a flow of hydrogen-rich reformate contacts the catalyst, and provides heat transfer to and from the catalyst. The dimensions and shape of the side wall depend on the volume and form of the oxidation catalyst as well as the heat transfer requirements that are needed to maintain the oxidation reaction within a desired temperature range. The side wall can have various ports for accessing the interior of the reactor. Such ports can include ports for introducing a thermocouple or other temperature sensing means as well as means for monitoring pressure and reformate composition. In some embodiments, the side wall can comprise two or more sections that are separable from one another to provide access to the interior of the reactor such as for removing and/or replacing catalyst. In embodiments where the catalyst bed is a cylindrical or annular-shaped catalyst bed, the side wall preferably comprises a cylindrical tube.

A catalyst capable of oxidizing carbon monoxide is disposed within the reactor adjacent the inner surface of the side wall. The catalyst can take a variety of known forms including pellets, spheres, extrudates, monoliths, as well as common particulates and agglomerates. Catalyst having activity for the oxidation of carbon monoxide are well known. See "Selective combinatorial catalysis; challenges and opportunities: the preferential oxidation of carbon monoxide," Catalysis Today, vol. 81, pp. 437-447 (2003), the disclosure of which is incorporated by reference. Such catalysts can include noble metal-based catalysts such as alumina-supported platinum group metal catalysts, zeolite supported platinum group metal catalysts, and metal oxide-supported gold catalysts. In addition, a $CuO—CeO_2$ oxide catalyst has been proposed for the oxidation of carbon monoxide because it is believed to be more active and selective than platinum catalysts at lower reaction temperatures.

In some embodiments, the catalyst will be disposed within a cylindrical or annular bed that is supported within the reactor. A support screen or other perforated member can be affixed to the inner surface of the side wall to support the bed within the reactor. The catalyst bed is preferably a cylindrical catalyst bed disposed adjacent an inner surface of the side wall having a length, diameter and ratio of length to diameter of at least about 4:1, preferably at least about 5:1 and more preferably at least about 6:1. In addition, the ratio of length to diameter of the catalyst bed should be less than about 48:1 preferably less than about 36:1, more preferably less than about 24:1, still more preferably less than about 20:1 and even more preferably less than about 16:1.

In other embodiments, it may be desirable to affix at least a portion of the oxidation catalysts to the inner surface of the side wall and/or to a thermally conductive member, such as a metal fin, disposed within the side wall of the reactor. Preferably, a thermally conductive member disposed within the side wall of the reactor will have an extended surface area and will be in thermal communication with the side wall so as to promote heat transfer between the catalyst and the side wall.

A reactor of the present invention provides an enlarged area for heat transfer relative to the volume of catalyst held within the reactor. At low mass flow rates, the reactor can approach self-regulating cooling although supplemental cooling is required for higher flow rates and for ensuring that the oxidation catalyst remains within the desired temperature range. To this end, the reactor of the present invention comprises heat transfer means for transferring heat to and from the oxidation catalyst. The heat transfer means is in thermal communication with the side wall and can be disposed adjacent the outer or inner surfaces of side wall of a reactor. In addition, it is preferred that the heat transfer means be capable of providing heat to the reactor during one or more modes of operation, e.g. a pre-heat or start-up, and capable of removing heat during others. It is preferred that the heat transfer means ensure that the oxidation reaction temperatures of the catalyst remain within the range of between about 75° C. and about 200° C. and preferably between about 85° C. and about 120° C.

A variety of approaches for heat transfer can be adapted to a reactor or apparatus of the present invention. In some embodiments, the heat transfer means comprises heat exchange tubing disposed adjacent an outer surface of the side wall of the reactor, preferably opposite the catalyst bed. The tubing can be aligned axially along the length of the reactor side wall or coiled around the side wall. The external surface of the tubing can have structures such as fins for increasing the heat transfer surface area and improving heat transfer, or the tubing surface can be free of such structures. In embodiments where heat exchange tubing is axially aligned with the side wall of the reactor, the use of such structures is preferred so as to reduce the quantity and volume of tubing needed to achieve the desired heat transfer. In embodiments where the heat exchange tubing is coiled around the reactor side wall, the need for fins and other surface area extending structures is more limited.

The heat exchange tubing is capable of containing a flow of a heat transfer fluid and will preferably have a reactor inlet for receiving a heat transfer fluid from a source and a reactor outlet for directing the fluid away from the reactor. Suitable heat transfer fluids are well known in the heat exchange and heat transfer arts.

The heat transfer fluid(s) can be dedicated to the heat transfer means of the present invention or derived from and shared with other components within a fuel processing system. For instance, combustors, burners, reforming reactors, shift reactors, fuel cells, hydrogen storage devices and the like all produce heated fluids that can be used in heating a reactor and apparatus of the present invention. More specifically, in some embodiments the heat transfer fluid used to pre-heat the oxidation catalyst comprises a steam generated at least in part from heat derived from an upstream shift reactor. Water circulated through a cooling coil in the shift reactor absorbs heat from the reaction and is converted to steam. The cooling coil is in fluid communication with the heat exchange tubing of the oxidation reactor of the present invention so that the steam can be directed to the reactor for pre-heating the catalyst. Fuel processing systems also typically have water reservoirs, coolant loops and air flow subsystems that utilize various cooling media for servicing process units. Fluid communication between such systems and the heat exchange tubing can provide the cooling medium to a reactor or apparatus of the present invention.

In embodiments where heat exchange tubing or other heat conducting structures are disposed adjacent the reactor side wall, the heat transfer means can further comprise a thermally conductive material such as a heat transfer paste for transferring heat between the tubing and the side wall. Such a material is generally applied to fill gaps and spaces that may exist between the side wall and the heat exchange tubing, but can also be used to enlarge the contact area for heat transfer between the side wall and tubing.

In some embodiments of the present invention, the reactor comprises an outer shell spaced apart from the side wall of the reactor that encloses the reactor inlet, the reactor outlet, side wall, and heat transfer means. In such embodiments, the heat transfer means preferably comprises a flow of a heat transfer fluid between the side wall and the outer shell so that the heat transfer fluid is in direct contact with the outer surface of the side wall. Suitable heat transfer fluids are described above. The outer shell associated with such a reactor can have a fluid inlet and a fluid outlet for directing the flow of heat transfer fluid into and out of the space between the side wall and the outer shell. In addition, such heat transfer means can comprise an extended surface area element disposed between the side wall and the outer shell for conducting heat to and from the outer surface of the side wall. Such surface area elements can comprise heat conducting materials and include metal fins that extend from the side wall of the reactor and a corrugated metal fin that is in thermal communication with the side wall of the reactor among others.

In addition, the heat transfer means of the present invention can comprise other heat exchange devices that are known in the art. Such devices can include heat generators such as burners, combustor and electrical heating elements as well as devices capable of removing heat from the side wall of the reactor such as heat sinks, heat pipes, and the like.

The side wall and other reactor and apparatus components described herein can be fabricated from any material or combination of materials that is capable of withstanding the operating conditions and chemical environment described herein. The operating pressure for the reactor and other process units are preferably from about 0 to about 100 psig, although higher pressures may be employed. Ultimately, the operating pressure of the reactor depends upon the delivery pressure required by the users of the carbon monoxide-depleted reformate produced. The operating temperatures within the reactor can vary depending on the oxidation catalyst, the reformate and oxidant flow rates and the pressure conditions among other variables. However, because of the kinetics of the three potential reactions noted above, it is preferred that the oxidation reaction be controlled at temperatures below about 200° C. Thermally conductive materials capable of withstanding the operating conditions and chemical environment of the reactions described are well known and are commonly used in heat exchange applications. More specifically, materials suitable for use in fabricating the side wall and other components can include, for example, aluminum, stainless steel, copper, nickel, chromium, iron, alloys of the same, and the like.

Where pressure losses across a preferential oxidation reactor are of increased concern such as in low pressure applications, the use of two or more of the reactors of the present invention in an apparatus can provide benefits both in terms of reaction temperature control and reduced pressure loss. Therefore, in another embodiment of the present invention, an apparatus for reducing the carbon monoxide concentration of a hydrogen-rich reformate is provided. Such an apparatus comprises a plurality of reactors wherein each of the plurality of reactors is parallel to one another.

As used herein, the term "parallel" is intended to refer to a plurality of preferential oxidation reactors that are configured within the process stream so that separate flows of reformate through the reactors occur at the same process stage. The term is used to contrast to a plurality of reactors that are arranged in series fashion one after another where a single process stream passes sequentially through each of the reactors. Furthermore, the term should not be construed to refer only to reactors that are arranged in strict geometric parallel to one another.

At least one of the plurality of reactors has a reactor inlet, a reactor outlet, and a side wall extending between the reactor inlet and reactor outlet. A cylindrical or annular catalyst bed is disposed adjacent an inner surface of the side wall of the reactor that comprises an oxidation catalyst capable of oxidizing carbon monoxide. A support screen or other perforated member can be affixed to the inner surface of the side wall to support the bed within the reactor. Preferably, the catalyst bed is cylindrical having a length, diameter and ratio of length to diameter of preferably at least about 4:1, more preferably at least about 5:1 and still more preferably at least about 6:1. In addition, the ratio of length to diameter of such a cylindrical catalyst bed should be less than about 48:1 preferably less than about 36:1, more preferably less than about 24:1, still more preferably less than about 20:1 and even more preferably less than about 16:1. Heat transfer means, as is described above, is disposed adjacent an outer surface of the side wall. In some embodiments, the apparatus will comprise two or more reactors with such features and in others, each of the plurality of reactors in the apparatus will have such features.

An apparatus of the present invention further comprises an inlet manifold that is disposed upstream of the plurality of reactors and is in fluid communication with a reactor inlet of each of the plurality of reactors for providing a continuous flow of hydrogen-rich reformate to the plurality of reactors. As used herein, the relative terms "upstream" and "downstream" are in reference to the direction of flow of hydrogen-rich reformate through a reactor or apparatus of the present invention.

The inlet manifold can have a fitting or other connection means for connecting with a source of hydrogen-rich reformate and/or a source of oxidant. The hydrogen-rich fluid and oxidant can be mixed upstream from the manifold or delivered separately and combined within the manifold. In the latter case, an optional mixer such as a static mixer, can be used to provide a more uniform mixture of hydrogen-rich reformate and oxidant. In some embodiments, the inlet manifold can comprise a valve or other closure means so that the flow of reactants to the reactors can be interrupted and/or restricted.

Within the inlet manifold, the flow of hydrogen-rich reformate is divided into a plurality of parallel reformate streams. The division of reformate into separate streams can be achieved with or without specific structure(s) within the manifold. For instance, a diverter can optionally be disposed within the manifold for splitting the flow into a plurality of parallel streams. In other embodiments, the manifold can comprise a reservoir having an inlet in an upstream region and a plurality of outlets, each of which is in fluid communication with one of the plurality of reactors disposed downstream. The flow of hydrogen-rich reformate through the reservoir divides the flow into a plurality of parallel reformate streams under substantially uniform pressure. The reservoir outlets can provide direct access to the interior of the plurality of reactors or can be connected to the reactor via conduits.

An outlet manifold is disposed downstream of the plurality of reactors that is in fluid communication with the outlet of each of the plurality of reactors for directing a carbon monoxide-depleted reformate from the apparatus. The outlet manifold combines separate streams of reformate received from the plurality of reactors before directing the reformate out of the apparatus. The outlet manifold can have a fitting or other connection means for connecting the manifold with downstream process units, storage or a hydrogen-consuming device. In some embodiments, the reactor outlet may comprise a valve or other closure means so that the flow of carbon monoxide-depleted reformate from the apparatus can be interrupted and/or restricted.

An apparatus of the present invention can further comprise an outer shell space apart from the plurality of reactors that encloses the plurality of reactors, the inlet manifold and the outlet manifold. In such embodiments, the heat transfer means preferably comprises a flow of a heat transfer fluid between the side walls of the reactors and the outer shell so that the heat transfer fluid is in direct contact with the outer surfaces of the reactors. The outer shell can have a fluid inlet and a fluid outlet for directing a flow of heat transfer fluid into and out of the apparatus. In addition, such heat transfer means can comprise an extended surface area element disposed between the side walls and the outer shell for conducting heat to and from the side walls. Such surface area elements comprise heat-conducting materials and can include metal fins that extend from the side walls of the reactors and a corrugated metal fin that is in thermal communication with the side walls of the reactors among others.

In a process aspect of the present invention, a method for removing carbon monoxide from a hydrogen-rich fluid is provided. The method comprises the steps of providing heat to a plurality of reactors to raise the temperature of a catalyst within each of the plurality of reactors to a reaction temperature above about 75° C. Pre-heating the oxidation catalyst reduces the time needed to heat the catalyst to a desired reaction temperature and thereby enables the reactor to begin producing a carbon monoxide-depleted reformate in less time. Heat can be provided to the plurality of reactors by directing heat to an external surface of the reactors via heat transfer means. In some embodiments, heat is directed to the external surfaces by directing a flow of heated fluid to the external surfaces of the reactors, preferably, adjacent the oxidation catalyst. In some embodiments, steam generated at least in part from heat derived from a water gas shift reactor is directed to the plurality of reactors to pre-heat the reactors and the oxidation catalyst.

A flow of reformate comprising carbon monoxide is divided into a plurality of parallel reformate streams. The division of the flow of reformate into separate parallel reformate streams enables subsequent oxidation of carbon monoxide in the reformate stream without imposing significant pressure losses. Further, the oxidation of carbon monoxide in separate streams over catalysts in separate reactors provides improved temperature control over both the individual reactors and the oxidation reaction as a whole.

At least a portion of the carbon monoxide in each of the parallel reformate streams is oxidized over an oxidation catalyst disposed within each of the plurality of reactors to produce heat and a carbon monoxide-depleted reformate. In some embodiments, the portion of carbon monoxide is oxidized in a cylindrical catalyst bed having a length, diameter and ratio of length to diameter of at least about 4:1, preferably at least about 5:1 and more preferably at least about 6:1. In addition, the ratio of length to diameter of the cylindrical catalyst bed should be less than about 48:1 preferably less than about 36:1, more preferably less than about 24:1, still more preferably less than about 20:1 and even more preferably less than about 16:1.

Heat is removed from the plurality of reactors so that the reaction temperature of the oxidation catalyst is less than about 200° C., preferably less than about 180° C., more preferably less than about 160° C., even more preferably less than about 140° C., and still more preferably less than about 120° C. The reaction temperature of the oxidation catalyst can be monitored using conventional temperature sensing means such as thermocouples and the like. Moreover, where a plurality of reactors are used, monitoring the temperature of one or more of such individual reactors can be used to maintain optimum carbon monoxide oxidation conditions. Heat can be removed from the plurality of reactors by removing heat from an external surface of the reactors via described heat transfer means. In some embodiments, a flow of a cooling medium such as water is directed to the external surfaces of the reactors, preferably adjacent the oxidation catalyst.

The method can further include combining the carbon monoxide-depleted reformate stream from each of the plurality of reactors into a single reformate stream before directing the reformate stream to a downstream process unit, storage or hydrogen-consuming device.

DETAILED DESCRIPTION OF THE FIGURES

Figure 1A:
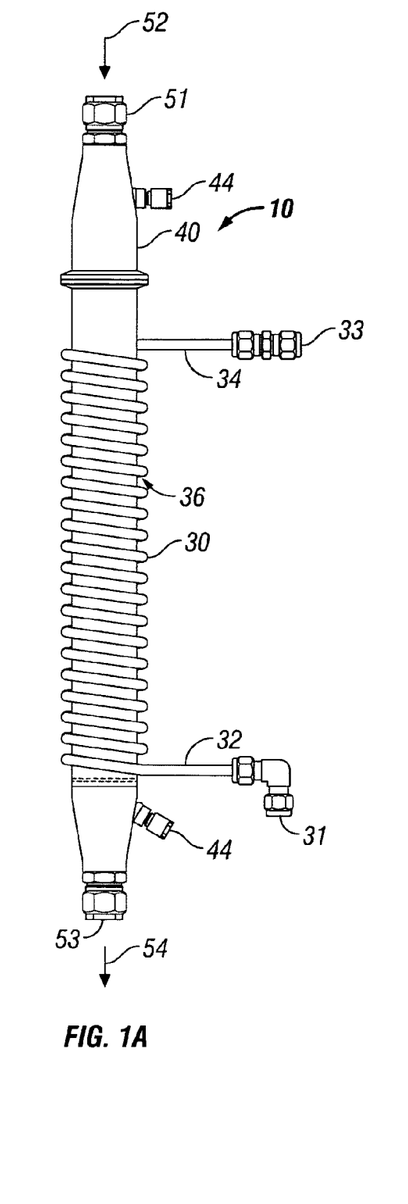
FIG. 1a is a side view of a reactor of the present invention.
Figure 1B:
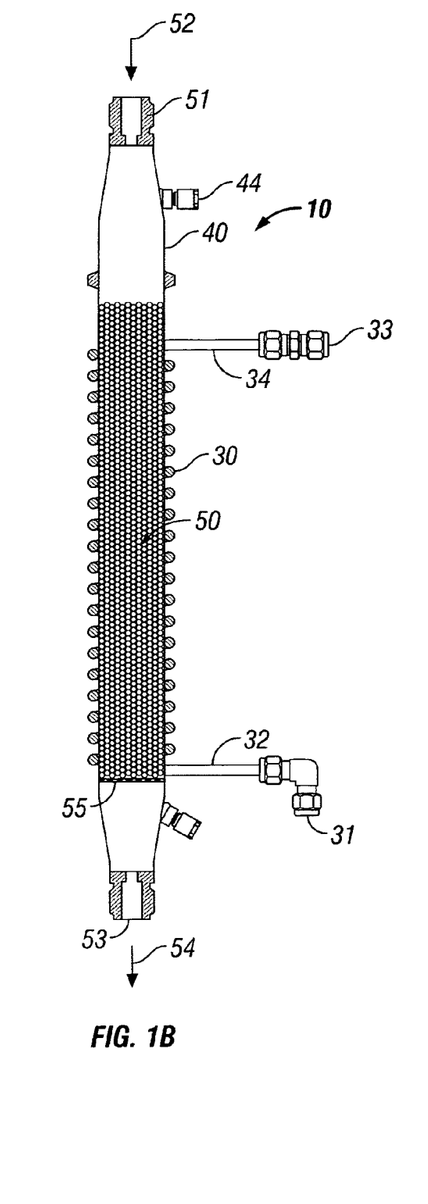

A reactor 10 of the present invention is shown in FIG. 1a as an elongated reactor vessel having reactor inlet 51 and reactor outlet 53. Cylindrical side wall 40 extends between the reactor inlet and the reactor outlet and encloses a cylindrical catalyst bed 50 that is shown in FIG. 1b. A flow of hydrogen-rich reformate and oxidant 52 is directed into inlet 51, and a flow of carbon monoxide-depleted reformate 54 is directed from outlet 53.

Heat exchange tubing 30 is wrapped around the outer surface of side wall 40 for providing heat to or removing heat from the side wall and the catalyst bed contained within. Heat transfer paste 36 is used in the spaces between the outer surface of side wall 40 and heat exchange tubing 30 to improve heat transfer between the side wall and the tubing. Heat exchange tubing 30 has inlet 32 and outlet 34 having fittings 31 and 33, respectively, for connecting with a source of heated fluid and a cooling medium. A flow of cooling medium, e.g. water, enters inlet 32 counter current to the flow of reformate through reactor 10. As the water travels upwards through tubing 30, it absorbs heat from side wall 40 and is generally converted to steam prior to exiting the tubing at outlet 34. Not shown are means for controlling the flow of such a heat transfer fluid to and from fittings 31 and 33. Thermocouple ports 44 are provided upstream and downstream of the catalyst bed for monitoring the temperature of the hydrogen-rich reformate and the carbon monoxide-depleted reformate, respectively.

FIG. 1b is a cross sectional view of the reactor of FIG. 1a that further illustrates packed cylindrical catalyst bed 50 supported on bed screen 55.

Figure 2:
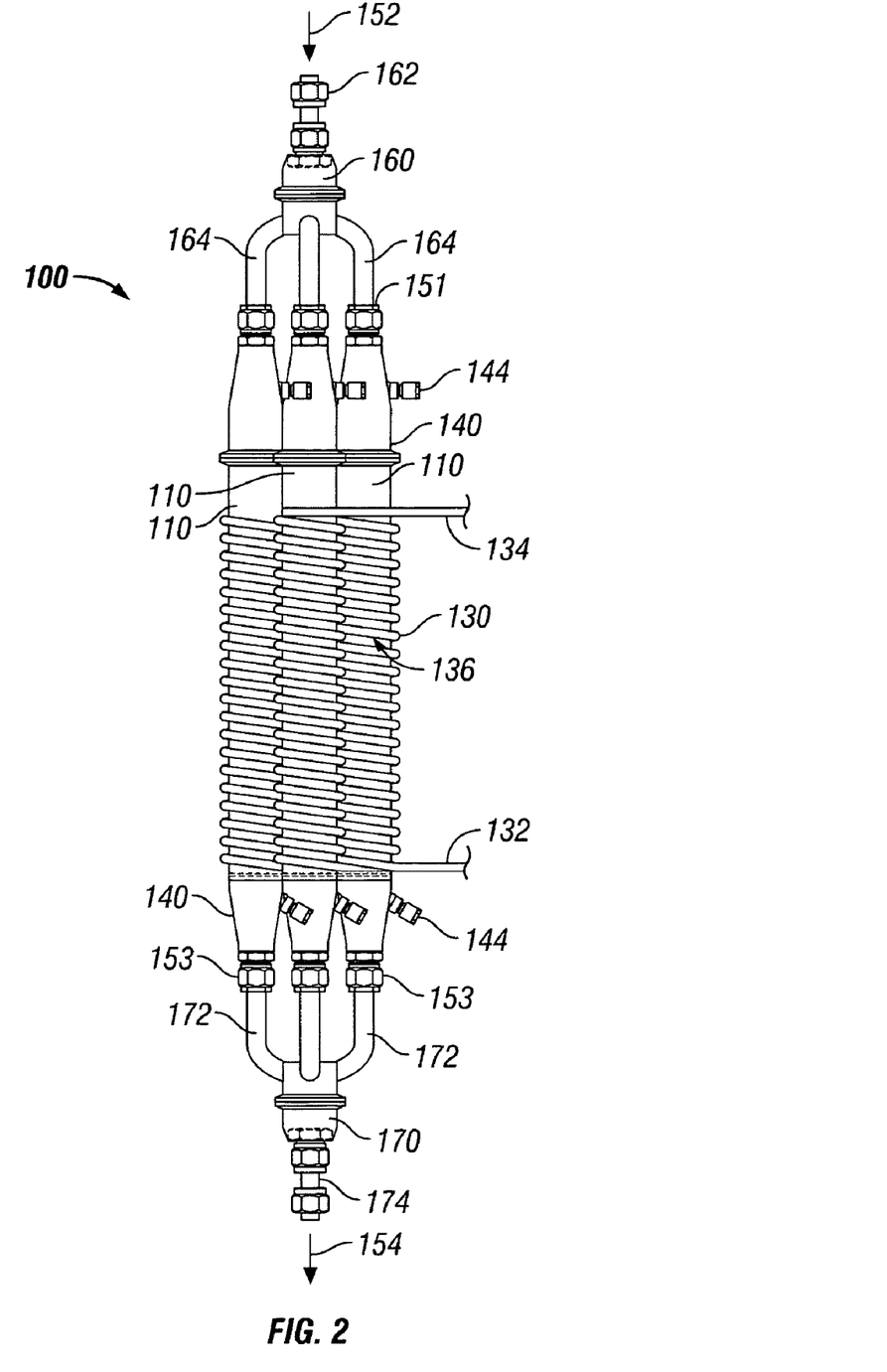
FIG. 2 is a side view of an apparatus of the present invention comprising a plurality of reactors.

FIG. 2 illustrates apparatus 100 of the present invention having a plurality of reactors 110. Each of the three reactors shown in FIG. 2 is similar to the reactor illustrated in FIGS. 1a and 1b, each having inlet 151, side wall 140, heat exchange tubing 130 and outlet 153. In addition, the illustrated apparatus has inlet manifold 160 that receives a flow of hydrogen-rich reformate and oxidant 152 through conduit 162 and divides the flow into three parallel reformate streams. Each of the parallel reformate streams is directed to one of the reactors through conduits 164. The parallel reformate streams flow down through the separate catalyst beds (not shown), where carbon monoxide is oxidized to carbon dioxide. The resulting carbon monoxide-depleted reformate 154 exits the reactors through outlets 153. The separate parallel carbon monoxide-depleted reformate streams are then directed to manifold 170 through conduits 172 where they are re-combined. Conduit 174 directs the carbon dioxide-depleted reformate from manifold 170 out of the apparatus.

Figure 3:
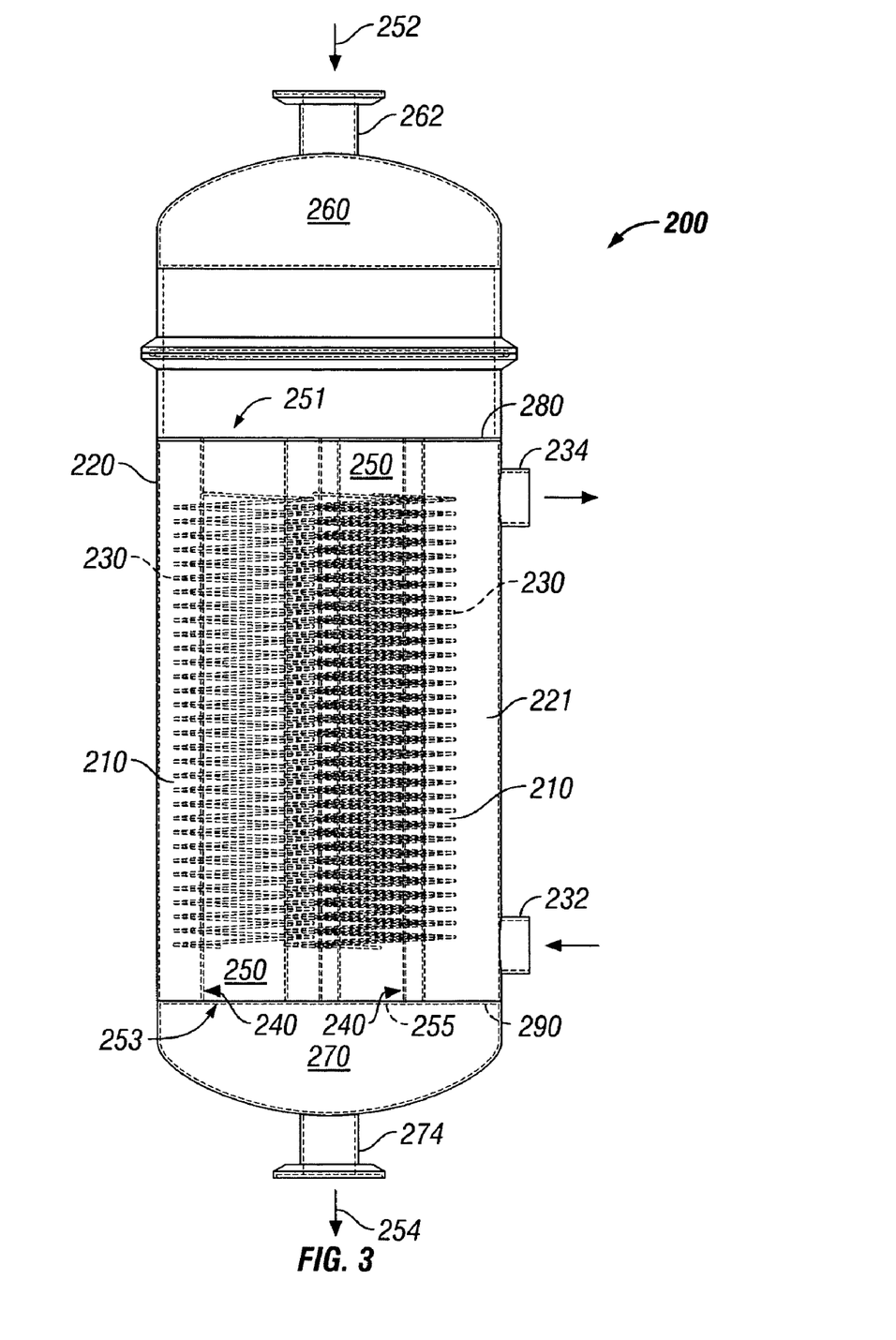
FIG. 3 is a cross sectional view of an apparatus of the present invention comprising a plurality of reactors.

FIG. 3 illustrates another embodiment of an apparatus of the present invention. Apparatus 200 includes reactor inlet 262 for introducing a flow of hydrogen-rich reformate and oxidant 252 into the apparatus. Outer shell 220 encloses inlet manifold 260, a plurality of reactors 210 (three are shown), and outlet manifold 270. Each of the plurality of reactors comprises inlet 251, outlet 253 and cylindrical side wall 240 that connects the inlets and outlets. A cylindrical catalyst bed 250 is provided within side wall 240 and is supported by bed screen 255.

Reactors 210 are supported within outer shell 220 by end plates 280 and 290, respectively. End plates 280 and 290 have openings for the inlets and outlets of each of the reactors 210. Extending from the outer surface of side walls 240 are metal fins 230 for improving heat transfer between the side walls and a heat transfer fluid flowing over those surfaces. Inlet 232 and outlet 234 are provided for circulating a heat transfer fluid such as a heated fluid, e.g. steam, or a cooling medium, e.g. water, through space 221. Space 221 is defined by the outer surfaces of side walls 240, the inner surfaces of outer shell 220 and end plates 280 and 290.

During operation, the flow of hydrogen-rich reformate and oxidant 252 is directed through reactor inlet 262 into manifold 260. Within manifold 260, the reformate and oxidant is separated into three parallel streams as enters they enter into one of the three reactors 210 via inlets 251. The parallel streams of reformate and oxidant flow down through cylindrical catalyst bed 250 where carbon monoxide is selectively oxidized. Where water is used as a cooling medium, a flow of water is introduced through inlet 232 that travels upwards through space 221, counter current to the flow of reformate through reactors 210. Typically, the water is converted to steam before it exits outlet 234. The carbon monoxide-depleted reformate 254 exits reactors 210 via outlets 253 into manifold 270 where the separate reformate streams are recombined. The carbon monoxide-depleted reformate 254 is then directed from the apparatus through reactor outlet 274.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for removing carbon monoxide from a hydrogen-rich reformate, the method comprising the steps of:

providing heat to a plurality of reactors to raise the temperature of a catalyst within each of the plurality of reactors to a reaction temperature above about 75.degree. C.;

dividing a flow of hydrogen-rich reformate comprising carbon monoxide into a plurality of parallel hydrogen-rich reformate streams;

oxidizing a portion of the carbon monoxide in each of the parallel hydrogen-rich reformate streams over an oxidation catalyst disposed within each of the plurality of reactors to produce heat and a carbon monoxide-depleted reformate; and removing heat from the plurality of reactors so that the reaction temperature of the oxidation catalyst is less than about 200.degree. C.

2. The method of claim 1, wherein heat is provided to the plurality of reactors by directing heat to an external surface of each of the plurality of reactors.

3. The method of claim 2, wherein heat is directed to the external surfaces by directing a flow of heated fluid to the external surfaces.

4. The method of claim 1, wherein the portion of carbon monoxide is oxidized in a cylindrical catalyst bed having a length, diameter and ratio of length to diameter of at least about 4:1.

5. The method of claim 1, wherein heat is removed from the plurality of reactors by removing heat from an external surface of each of the plurality of reactors.

6. The method of claim 5, wherein heat is removed from the external surfaces by directing a flow of cooling medium to the external surfaces.

7. The method of claim 1, further comprising the step of combining the carbon monoxide-depleted reformate stream from each of the plurality of reactors into a single reformate stream.

* * * * *